Aug. 11, 1942.  H. E. DI CRISTINA  2,292,434
FRUIT TREATING MACHINE
Filed Nov. 7, 1940  4 Sheets-Sheet 3

Inventor
H. E. DiCristina
By Mason Fenwick & Lawrence
Attorneys

Patented Aug. 11, 1942

2,292,434

UNITED STATES PATENT OFFICE 2,292,434

FRUIT TREATING MACHINE

Harry E. Di Cristina, Davenport, Fla., assignor of one-half to Holly Hill Fruit Products, Incorporated, Davenport, Fla.

Application November 7, 1940, Serial No. 364,715

12 Claims. (Cl. 146—47)

The invention comprises a machine for treating fruit with fluid and the like, and more specifically the invention is applicable to the fluid treatment of citrus fruits, after they have been peeled, to remove whatever pulpy rind remains adhered to the fruit.

In its essentials the invention comprises one or more stations for treating the fruit with fluid, apparatus at each station for applying fluid to the fruit, and conveyor mechanism to transport the fruit to and away from each treating station, transporting the fruit to the several stations in succession. The invention includes mechanism for rotating the fruit at each treating station to expose the entire surface of each piece of fruit to the treating fluid.

Thus, in the case of fluid treatment to remove the pulpy rind from citrus fruit, the invention comprises a fluid treating station at which place a strong alkali, such as lye, is applied to the fruit. Thereafter the fruit is rinsed. The conveyor mechanism carries the fruit to the lye treating station, at that point rotates the fruit to expose its entire surface to the lye, transports the fruit away from the lye treating station and to the rinsing station, at the rinsing station rotates the fruit to expose its entire surface to the rinsing fluid, and transports the fruit away from the rinsing station, all in a continuous operation.

Pursuant to the practice of the invention, fruit carrying trays are provided with attaching means to attach them to the conveyor mechanism. Companion attaching means on the conveyor mechanism coact with the tray attaching means, and are spaced apart along the conveyor in accordance with the desired distance between trays. By this means the conveyor mechanism carries the plurality of trays successively to the several fluid treating stations as a continuous operation for treating fruit in quantity lots.

Each tray includes fruit mounting means comprising preferably a plurality of mounting members on each tray, each mounting member being adapted to receive and hold an individual piece of fruit. The mounting members may be of the type used to support the fruit in other machines, during other steps in the processing of the fruit, and the trays are preferably constructed to detachably receive such fruit mounting members. Each tray is equipped with mechanism for rotating the fruit, there being companion mechanism at each fluid treating station to cooperate with the rotating mechanism of the tray to rotate the fruit at the incident fluid treating station.

Pursuant to the practice of fluid treating citrus fruit, and with special reference to grapefruit, it is desirable to remove the pithy rind and core from the juice containing meat cells, and from the partitioning skin between sections, natural to the fruit. It is also desirable to remove the meat of each section, maintained as an integral mass. The preferred practice is to can a plurality of masses of juice containing meat cells, each mass comprising the meat of a section of the fruit. The device of the present invention is particularly adapted to "sectionize" the fruit for canning purposes. The several trays which carry the fruit to and away from the several fluid treating stations are readily attachable to and detachable from the conveyor mechanism as units and are capable of being readily detached from the conveyor after the trucks have left the last fluid treating station. Accordingly, upon the fruit trays being removed from the conveyor mechanism, they are adapted to be conveniently supported with the fruit carried thereby, in position for the "sectionizing" operation.

In the practice of the invention a number of modifications have been devised and proven practical. Several of the preferred modifications are presented in the accompanying drawings and their detailed description hereinafter. Attention is directed to the drawings for a more complete understanding of the invention, as also its several objects and advantages, which will be clear to those skilled in the art.

In the drawings:

Figure 4' is a detail cross section of a fruit supporting pedestal, taken on line 4'—4' of Figure 3;

Figures 1, 3, 4:
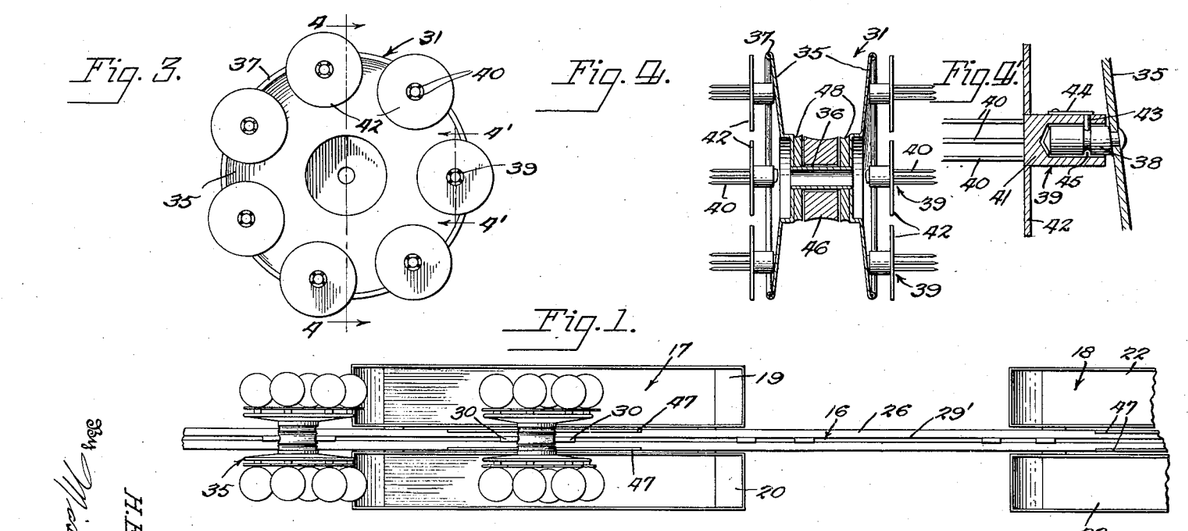
Figure 1 is a plan view of one embodiment of the machine.
Figure 3 is a fruit carrying tray adapted for use in the machine of Figures 1 and 2.
Figure 4 is a cross sectional elevation taken on line 4—4 of Figure 3.
Figure 2:
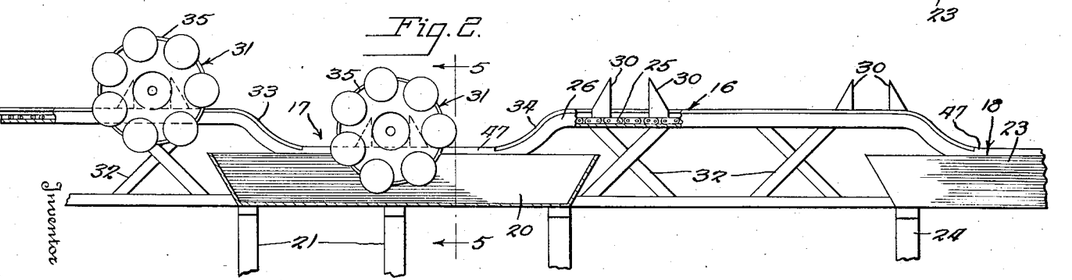
Figure 2 is a side elevation of the machine of Figure 1, with portions thereof shown in section for clearness of illustration.

In the drawings, Figures 1 and 2, show a machine comprising a conveyor mechanism, indicated generally at 16, which transports fruit to and away from one or more fluid treating stations, illustrated generally at 17 and 18, transporting the fruit to the several stations in succession and transporting the fruit to the respective stations in the order in which the several fluids are to be applied to the fruit in the incident process. There may be as many fluid treating stations 17 and 18 in the path of the conveyor mechanism 16 as are required for the process to be performed by the machine.

For example, in the preparing of citrus fruits for canning, and especially in the preparation of grapefruit for canning, the outer peel of the fruit is first removed. This leaves a portion of the pulpy white rind still unremoved from the fruit and it is desirable to remove the rind before the fruit is canned. Accordingly, the fruit is first treated with a strong alkali, such as a solution of lye, which releases and removes the pulpy rind. Thereafter the fruit is rinsed, for example, with water, to remove the excess lye therefrom. Thus, in the incident embodiment of the invention shown the fluid treating station 17 may comprise a lye bath, and the fluid treating station 18 a rinsing bath.

In the embodiment of Figures 1 and 2, both baths shown are of the type to permit the fruit to be submerged in the liquid, although either or both may, within the purview of the invention, be of the spray type, similar to those shown in connection with machines of the other embodiments. The treating station 17, comprising the lye bath, provides the set of troughs 19 and 20 on opposite sides of the conveyor mechanism 16, which troughs rest on support legs 21. Treating station 18, comprising the rinsing bath, provides the set of troughs 22 and 23 similar to the troughs 19 and 20. In a like manner they are disposed on opposite sides of the conveyor 16, and are supported on legs 24. The construction of the respective fluid treating stations 17 and 18 is similar in other respects, and description of one will suffice for an understanding of both.

Figures 5, 6:
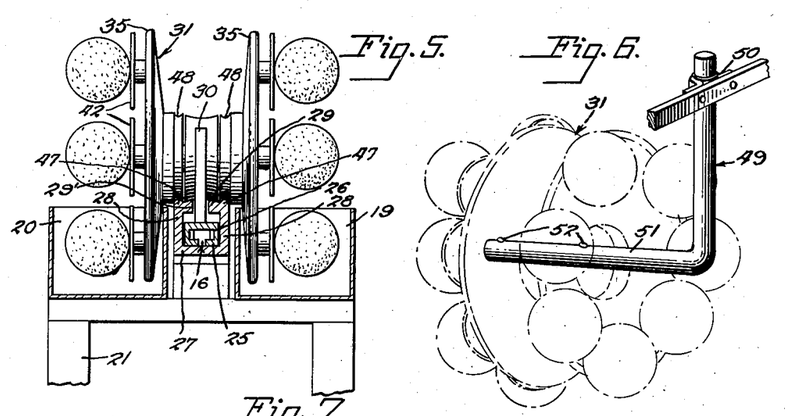
Figure 5 is a cross sectional elevation taken on line 5—5 of Figure 2.
Figure 6 is a perspective view of a supporting device to receive the tray of Figure 3.

The conveyor mechanism 16 is continuous, and transports the fruit to and away from the treating stations 17 and 18 in succession. The conveyor mechanism 16 preferably comprises a conveyor chain 25 or a similar strand construction, which travels in the guide channel 26. The guide channel 26, as seen in Figure 5, provides the bottom rail 27 on which the chain 25 rides, and the side walls 28 which guide the chain laterally in its path of travel. The channel 26 also provides an enclosing upper deck 29, in two parts to provide the slot 29' between them. The slot 29' receives the tray engaging arms 30 guided therein.

The tray engaging arms 30 are attached to predetermined spaced apart links of the chain 25, and project upwardly through the slot 29' and beyond to a position high enough to engage a fruit carrying tray, illustrated generally at 31. The tray engaging arms 30 are provided in pairs spaced apart longitudinally of the chain in accordance with desired distance between trays passing through the machine. Each pair of arms 30 comprises a leading and trailing member to engage the tray in front and back confining the tray between them. Thus, each pair of arms 30 connects a tray 31 to the chain 25 to be transported thereby.

Between the fluid treating stations 17 and 18, and elsewhere in the machine away from stations 17 and 18, the guide channel 26 is supported by superstructure 32 above the level of the sets of troughs 19, 20 and 22, 23. Where the guide channel 26 enters each station 17 and 18 it dips at 33 far enough to immerse the fruit into the fluid of the sets of troughs 19, 20 and 22, 23, and the channel 26 rises again to its normal level at 34, where the conveyor leaves the stations 17 and 18.

The fruit carrying trays 31, in the embodiment of Figures 1 and 2, are circular, and each comprises a pair of discs 35, each disc being equipped to support several pieces of fruit to be fluid treated, for example, by being dipped in the sets of troughs 19, 20 and 22, 23. The discs are attached to opposite ends of the core cylinder 36 which is long enough to span the conveyor channel 26, and to position the respective discs 35 in the troughs 19, 22 and 20, 23 respectively on opposite sides of the channel.

Near the rim 37 of each disc 35 there are provided the fruit supporting pegs 38, each being attached to a disc 35 by any suitable means, and the several pegs 38 being positioned in a circle spaced apart from each other circumferentially, as shown. Seven pegs 38 are shown in the embodiment of Figures 3 and 4, but there can be more or less if desired. Each piece of fruit is supported separately on its own pedestal, indicated generally by reference numeral 39, these pedestals being detachably attached to the tray 31.

Each pedestal 39 comprises a set of impaling prongs 40 attached to the base cylinder 41 and disposed in a circle, as shown, spaced apart circumferentially of the circle. Each piece of fruit is adapted to be impaled on a set of prongs 40 in the direction of its axis through the stem and the blossom. So positioned on the pedestal 39 the set of prongs 40 will surround the core, in the case of citrus fruit comprising a pithy white, unpalatable mass. The several tines will project into the sections natural to the fruit, which radiate out from the core, and each prong will be positioned in a section within the enclosing skin thereof at a point adjacent the core where the skin is toughest. Fixed to the base cylinder 41, concentrically therewith, is the disc 42, which provides a convenient gripping member for turning the pedestal manually on its axis. The base cylinder 41 is hollow, providing a bore which fits any of the pegs 38. A detent 43, actuated by the spring 44 fixed to the outside of the cylinder 41, projects through the wall of the cylinder to engage the circumferential groove 45 in the peg 38, yieldingly held in the groove by the spring 44.

The pedestals 39 can be used to support the fruit in other machines, and for carrying out other steps in its processing, and are readily attachable to the tray 31, by projecting the cylinder 41 of each pedestal on a peg 38 of the tray.

The fruit carrying tray 31 comprises a traction wheel 46 mounted on the core cylinder 36 preferably rotatable thereon, and positioned preferably midway between the discs 35. The wheel 46 fits the upper deck 29 of the guide channel 26, which thus provides a trackway for the wheels of the several trays 31. The leading and trailing arms of each pair of arms 30 are spaced apart to an extent to permit the wheel 46 to fit between them. Each pair of arms 30 thus confines a wheel 46 to transport its tray 31 along the trackway provided by the upper deck 29 of the channel 26. In transit to and away from the treating stations 17 and 18 the trays can rotate within their wheels 46, but whether or not they rotate is unimportant, and no means are provided for positive rotation of the trays 31 away from the fluid treating stations.

At each fluid treating station 17 and 18, means are provided to rotate the trays 31. The axes of the trays 31 are maintained above the level of the fluid, and only the lowermost fruit is in position to be submerged. Rotation of the tray submerges each pedestal 39, and the fruit impaled thereon, into the fluid in the troughs 19, 20 and 22, 23. Accordingly, the trackways 47 are disposed along each side of the guide channel 26, Figure 5. Each tray is provided with a pair of traction bands 48, disposed on opposite sides of the wheel 46, and fixed to the core cylinder 36 adjacent the respective discs 35. The respective traction bands 48 are positioned to engage the trackways 47 on opposite sides of the trackway 29 to be actuated thereby to rotate the tray as it is transported along the length of the trackways 47 by the chain 26. The trackways 47 are present at each station 17 and 18, between the dip 33 and the rise 34 of the guide channel 26, to rotate the tray during the time it submerges fruit in the treating fluid. See Figures 1 and 2. As each tray 31 is transported to a station 17 or 18, and negotiates the dip 33 to immerse its fruit in the fluid, the traction bands 48 engage the trackways 47, which operate the rotate the tray on its axis. The bands 48 remain in engagement with the trackways 47 until the tray arrives at the rise 34. The length of the trackways 47 is predetermined to immerse each piece of fruit in the fluid the requisite time for the desired fluid treatment at the incident station 17 or 18.

In the canning of citrus fruit, especially in the case of grapefruit, the fruit is "sectionized." This process comprises the separation of the several sections natural to the fruit, and the removal intact of the mass of juice containing meat from the respective section enclosing skins. Following the fluid treating operations of the hereinbefore described machine, the respective fluids of the stations 17 and 18, comprising an alkali and a rinse, the fruit is clean and free from rind, and is ready to be sectionized. For this purpose the bracket arm 49, suspended from its attachment 50, is positioned adjacent the conveyor 26 at some point near where the trays leave the station 18. The successive trays, as they leave the station 18, are manually removed from between the tray engaging arms 30, and each is hung on a bracket 49 by projecting the core cylinder 36 onto the projecting arm 51 of the bracket. Detents 52, spaced apart longitudinally of the arm 51, engage opposite ends of the cylinder 36 to hold it properly positioned on the arm 51. An operator engaged in the process of sectionizing engages the disc 42 of a given pedestal 39 with one hand to steady it while the other hand is employed to remove a section from the fruit. The disc 42 is manipulated to rotate the pedestal on the peg 38 to bring successive sections in position to be removed. As each fruit is sectionized, the truck is rotated on the arm 51 to bring the next succeeding piece of fruit in position to be sectionized.

Figures 7, 8:
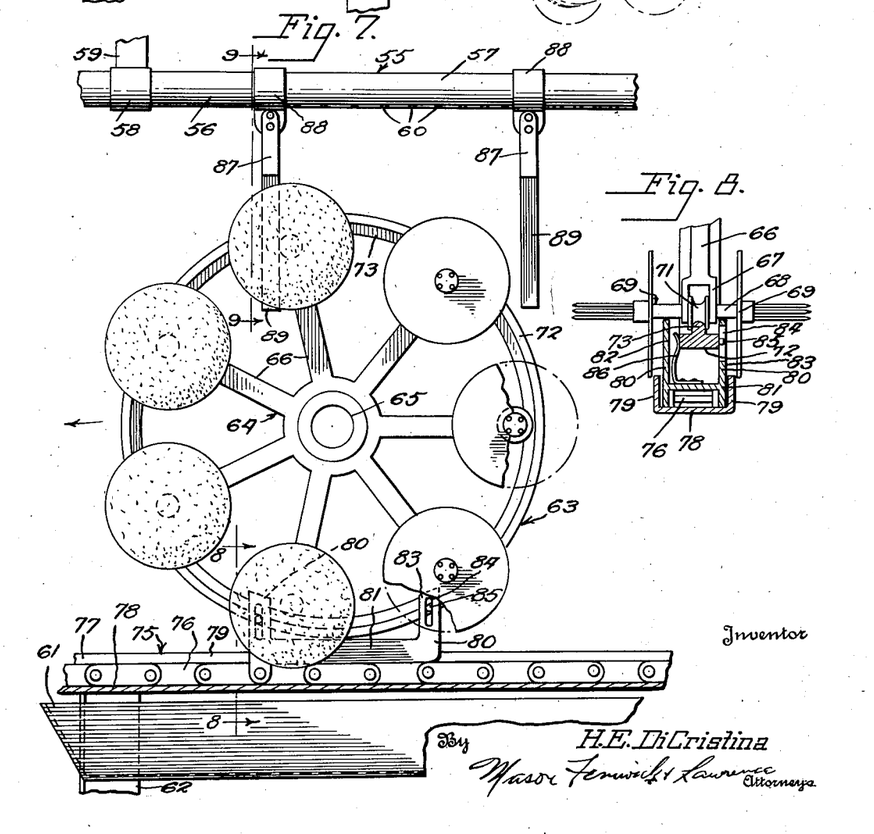
Figure 7 is a side elevation of a second embodiment of the machine.
Figure 8 is a detailed sectional view taken on line 8—8 of Figure 7.

According to a second embodiment of the invention, shown in Figure 7, the fluid treatment is performed by a spray mechanism, illustrated generally at 55, which projects a spray down upon the fruit as it passes through the several fluid treating stations, actuated by conveyor mechanism. In accordance with this practice of the invention, the spray mechanism 55 comprises a pipe or tubing 56 with longitudinal legs 57, disposed in the direction of travel of the fruit, and transverse legs 58 to join the several longitudinal legs to provide a continuous piping system. Support elements 59, Figure 7, hold the tubing suspended with the longitudinal legs disposed above the path of travel of the fruit. The longitudinal legs 57 are provided with perforations 60 which enable the tubing to project streams of fluid preferably downwardly upon the fruit as it passes below the longitudinal legs 57. The perforations 60 are so disposed circumferentially of the tubing that they direct the streams upon the fruit, in the instant case disposed directly below the longitudinal legs 57. See Figure 9.

In this embodiment there is also a plurality of fluid treating stations, such as 17 and 18 in the embodiment of Figures 1 and 2, and the several stations may be alike or one may be of the spray type, as described, and another of the dip type, as is present in the embodiment of Figures 1 and 2.

When the spray type fluid treating station, such as is illustrated in Figure 7, is employed, a drip pan 61 is also present, supported by any suitable means such as the legs 62. The drip pan 61 is wide enough to insure catching all fluid which drips off the fruit as well as the particles of rind removed from the fruit by the fluid treatment. The drip pan 61 is long enough to encompass the fluid treating station extending from a point somewhat before the fruit reaches proximity of the perforations 60 and extending beyond the proximity of the perforations 60.

The fruit may be transported, under the practice of the embodiment of Figure 7, on any suitable tray. According to the instant showing, a tray 63 is employed which differs from the tray shown in connection with the embodiment of Figure 1 in certain particulars now to be described. The tray 63 comprises a spider 64 with a core cylinder 65 similar to the core cylinder 36 of the embodiment of Figures 3 and 4 in that it is adapted to be attached to the bracket 49 in the same manner for sectionizing the fruit. Attached to the core cylinder 65, spaced apart circumferentially, are the arms 66, radially disposed, as shown, each arm preferably being of the same length and extending away from the center as represented by the core cylinder 65 to the same extent. At the terminus of each arm there is a bearing bracket 67, Figure 8, supporting the pivot pin 68 rotatable therein. Each pivot pin is adapted to carry two pieces of fruit one on each side of the spider 64. In accordance with this construction, the spider supports a plurality of pieces of fruit at its periphery, disposed spaced apart circumferentially with equal distances between the fruit, there being as many pieces of fruit on each side of the spider as there are radial arms 66. In the instant case, illustrated in Figure 7, there are seven pieces of fruit on each side of the spider. More or less pieces of fruit may be provided for within the scope of the invention.

In the form of tray 63, each pivot pin 68 projects laterally from opposite sides of the spider to provide a peg 69 on each side for receiving and supporting a fruit carrying pedestal. The fruit carrying pedestals used with the tray 63 may be fixed to the pegs 69, as shown, or may present identically the same structure as the pedestal employed with trays 31.

Each pivot pin 68 of the tray 63 has a sheave 71 keyed to it, the sheaves 71 being disposed in the central plane of the spider 64, within the bearing bracket 67, as illustrated in Figure 8. Tray 63 is provided with an annular ring 72 in which the spider 64 is supported concentrically by engagement with the sheaves 71. The ring 72 is provided with an inside trackway 73 which engages the several sheaves 71 of the respective spider arms 66, and which rotates the pins 68 whenever the spider 64 is rotated relative to the annular ring 72.

Conveyor mechanism, illustrated generally at 75, is provided to transport the trays 73 in succession to and away from one or more fruit treating stations, similar to the stations 17 and 18 in the embodiment of Figures 1 and 2. The conveyor mechanism 75 is attached to the tray 63 in a manner to engage the annular ring 72 and withhold it against rotation.

In the embodiment of Figure 7, the conveyor comprises a chain 76 upon which the spiders rest, spaced apart along its length. The chain 76 rides in a guide channel 77, which is supported by any suitable means, as by the legs 62 which also support the drip pans 61. The guide channel 77 provides the bottom rail 78 on which the chain 76 rides, and the side rail 79 which guides the chain laterally in its path of travel. One or more spider supporting cleats 80 are attached each to a link of the chain and are preferably constructed unitary, joined together by the connecting bar 81. Each cleat 80 provides prongs 82 and 83 projecting upwardly from the chain 76 on opposite sides of the spider 64. One prong 83 provides a notch 84 to receive a pin 85 which projects laterally from the annular ring 72, the pin and notch providing a connecting attachment between the conveyor chain 76 and the tray 63, for the chain to transport the tray as it moves in the guideway 77. The prong 82, disposed opposite the prong 83, provides a backing for the tray to hold the pin 85 in the notch 84. The leaf spring 86, illustrated in Figure 8, permits the tray 63 to be deflected toward the prongs 82 for the pin 85 to be moved outside the notch 84, enabling the tray 73 to be lifted off of the conveyor chain 76.

Means are provided at each fluid treating station to rotate the spider 64 relative to the annular ring 72. In the instant embodiment shown, such means comprise one or more actuating arms 87 attached to the tubing 56 by means of holding bands 88. Each actuating arm is directed downwardly to provide an abutment member 89 disposed in the path of the pivot pin 68. As the tray 63 is advanced into and through the fluid treating station, one or the other of the pins 68 engages the abutment 89, which causes the spider 64 to rotate inside the annular ring 72 as the annular ring is carried along by the chain 76 supported on the cleats 80. Each abutment 89 rotates the spider 64 through a predetermined arc within the annular ring 72 depending upon the time of engagement with the abutment 89, which, in turn is predetermined by the length of the arm 87. Rotation of the spider 64 in the annular ring 72 rotates the several pivot pins 68 on their respective axes, and rotates each piece of fruit to expose its entire surface to fluid treatment. Additional arms 87 may be provided to engage subsequently approaching pivot pins 68 to continue rotation of the spider 64 to bring all pieces of fruit under action of the fluid spray, and to rotate each piece of fruit as it moves along under the spray to expose its entire surface to fluid treatment. As many arms 87 are provided as are required and they are spaced apart longitudinally of the tubing 57 in accordance with the requirements to accomplish the purpose explained.

Figures 9, 10:
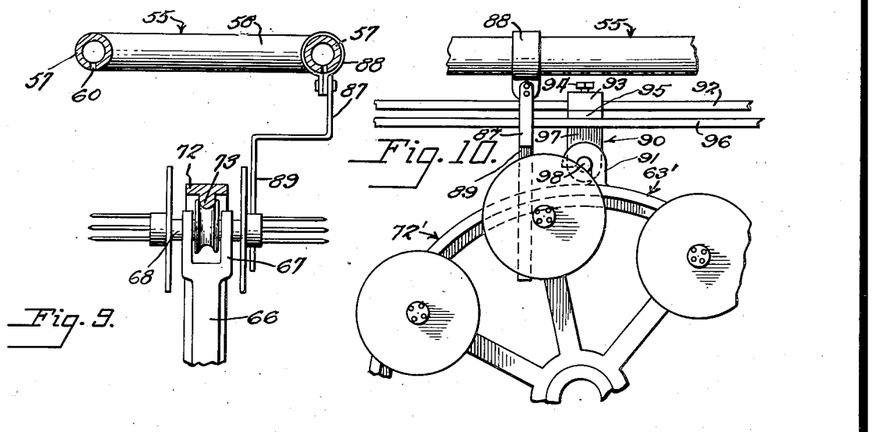
Figure 9 is a detailed sectional elevation taken on line 9—9 of Figure 7.
Figure 10 presents a modified form of the machine of Figure 7.

As a modified form of the embodiment shown in Figure 7, an overhead conveyor mechanism, illustrated generally at 90 in Figure 10, may be employed instead of the chain and guide channel construction 76 and 77 illustrated in Figure 7. In the practice of this modification the liquid spray does not strike the conveyor mechanism, and thus the conveyor mechanism is not contaminated by the strong chemicals used for some fruit processing.

In the practice of this modification, the tray construction may be substantially the same as that illustrated in Figure 7, with the principal exception that the pins 85 are not required. In their stead the hook 91 is provided, Figure 10, attached to the annular ring 72' of the tray 63'.

The conveyor mechanism comprises a strand 92, which may be a cable or the like. Skids 93 are attached to the strand 92 by any suitable means, such as set screws 94, the skids 93 being spaced apart along the strand 92 at predetermined intervals in accordance with the limits of permissible sag in the strand. The skids 93 are provided with arms 95 projecting laterally on opposite sides of the strand to rest upon and slide along the guide rails 96 as the cable is moved through the machine to and from the several fluid treating stations such as 17 and 18. Each skid 93, or predetermined ones thereof depending upon the desired spacing between trays 63', is provided with downwardly directed arms 97 with the pins 98 fixed thereto. The pins 98 are positioned to receive and engage the hooks 91, there being a pin 98 for each skid 93 which is to carry a tray 63'.

It will be obvious that in the alternative modifications of Figures 7 and 10, the conveyor mechanism 75, comprising the supporting chain 76, and the conveyor mechanism 90, comprising the strand 92 which supports the trays 63', must move at the same longitudinal speed in order that the fluid treatment of the fruit is the same under the practice of either modification.

Figure 11:
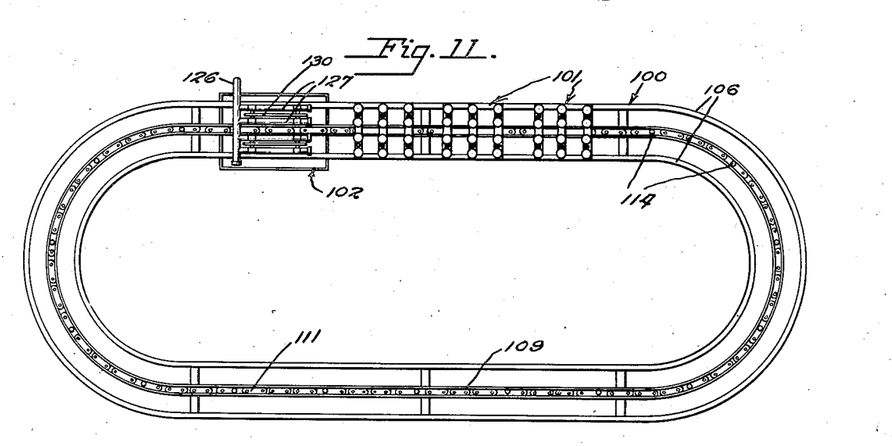
Figure 11 presents an additional embodiment of the machine of the invention.
Figure 12:
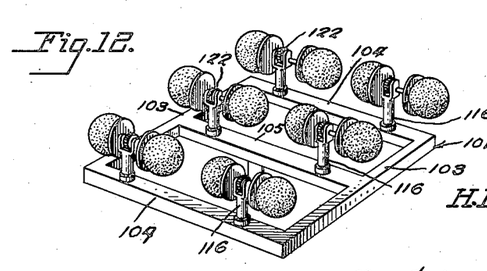
Figure 12 is a perspective view of the fruit carrying tray adapted for use with the machine of Figure 11.

In the embodiment illustrated in Figure 11, the fruit conveying mechanism, illustrated generally at 100, operates in a horizontal plane. The tray 101, illustrated in Figure 12, is in the form of a platen as distinguished from the disclike construction present in the trays 31, 63 and 63'. The fluid treating station, shown in connection with this embodiment, provides a fluid treating mechanism, illustrated generally at 102, which is similar to the fluid treating mechanism illustrated in Figure 7 in that it provides an overhead spray.

The tray 101 of the embodiment of Figure 10, provides a frame structure comprising side ribs 103, end ribs 104, and one or more interior connecting ribs 105. The interior connecting rib in the instant case shown, is disposed transversely to the direction of travel of the tray 101. The several side, end and interior ribs, 103, 104 and 105, comprise channel irons connected together by any suitable means, as by welding, to form the frame structure shown in Figure 12, although they may comprise any other suitable construction iron connected in any other suitable manner. The side ribs 103 are adapted to ride on the side rails 106 of the conveyor mechanism 100 and are spaced apart for this purpose in accordance with the spacing between the side rails 106. Disposed preferably at a central point of the platen comprising the tray 101 and projecting downwardly therefrom, is the conveyor engaging socket 107 which, in the instant case, is attached to the centermost interior rib 105. The positioning of the socket 107 centrally of the tray 101 affords the side ribs 103 ample lateral leeway at the end turns of the conveyor.

The conveying mechanism 100, comprising the hereinbefore noted side rails 106, includes the upright guide rails 108 which confine the truck 101 in the trackway provided by the conveyor mechanism. The conveyor mechanism includes a central trackway 109 provided with the bottom rail 110 on which the chain 111 rides. The trackway 109 includes the side guide rails 112 which confine the chain 111 laterally in its path of travel. The side rails 106 and the central trackway 109 are supported on legs 113, spaced apart and positioned to support the conveyor mechanism as a continuous path preferably in a horizontal plane, as illustrated in Figure 11. Attached to chain 111 and disposed at predetermined intervals along it, spaced apart in accordance with the distance desired between trays 101, are the upright pegs 114 which fit in the sockets 107 which attach the trays 101 to the chain 111 to be transported thereby in the path of travel of the conveyor mechanism through the machine.

By this mechanism it will readily be seen that a tray 101 can be attached to the chain wherever there is a peg 114, by simply positioning the socket 107 over the peg 114 and resting the tray between the guide rails 108 disposed in the direction of travel. At some point prior to the fluid treating station at 102 in Figure 11, the trays are placed on the conveyor chain 111, successive trays being attached to successive pegs 114. The trays thereupon are transported in succession through the one or more fluid treating stations similar to 17 and 18 in the embodiment of Figures 1 and 2, and are removed from the pegs 114 ready for the operation of sectionizing at a point after they have left the last fluid treating station.

Each tray 101 includes sets of fruit supporting pegs 115 which project upwardly from the ribs 103, 104, 105, which comprise the tray frame structure, the pegs 115 being arranged in sets, spaced apart laterally of the tray and arranged in rows longitudinally thereof, as illustrated in Figure 12. Each peg 115 accommodates a fruit supporting stand 116, each fruit supporting stand being adapted to accommodate two pieces of fruit.

Each fruit supporting stand 116 comprises a socket 117, downwardly directed, which fits a fruit supporting peg 115, and which includes the upwardly disposed bearing bracket 118. The shaft 119 rotates in the bearing 118 and projects in opposite directions beyond the bearing bracket 118 to provide the pegs 120. Each peg 120 is adapted to accommodate a fruit impaling pedestal, which may present the same construction as the pedestal 39 illustrated in Figure 4'.

Figures 13, 14, 15:
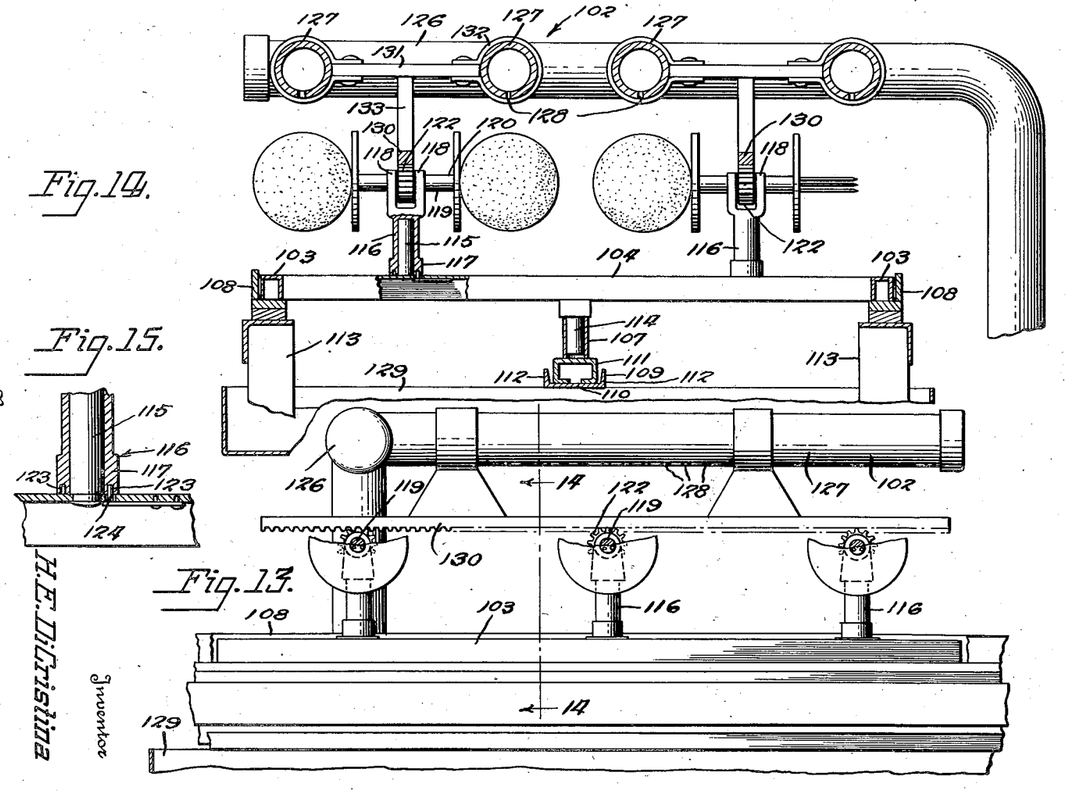
Figure 13 is a side elevation of the machine of Figure 11, showing the fluid treating mechanism in detail.
Figure 14 is a cross sectional elevation taken on line 14—14 of Figure 13.
Figure 15 is a cross sectional elevation of the tray of the machine of Figure 11, showing a detail thereof.

Fixed to each shaft 119 is the pinion 122 located within the bearing bracket 118. The pinion 122 is adapted to rotate in a plane in the direction of travel of the tray 101, and accordingly the wall of the socket 117 is provided with holes 123 diametrically opposite each other, Figure 15, either of which is adapted to receive the detent 124 spring actuated into the hole 123. The oppositely disposed holes 123 operate to position the pinion 122 in the line of travel of the tray 101, and also permit rotation of the socket 117 through 180° on the peg 115 to facilitate the operation of sectionizing the fruit after the tray has been removed from the conveying mechanism 100.

The fluid treating mechanism of the embodiment of Figure 11, may be of the submerging type described in connection with the embodiment of Figures 1 and 2, or it may, as shown, be of the spray type. Accordingly, as shown, it comprises the transverse tubing 126 to which the branch tubes 127 are connected by any suitable tube connecting means. The branch tubes 127 are disposed in the direction of travel of the fruit, preferably positioned directly above each row of fruit in the several tiers. Perforations 128 in the bottom of the branch tubes 127 are adapted to direct streams of fluid upon the pieces of fruit passing through the fluid treating station. The drip pan 129 sets below the conveyor mechanism 100 and extends far enough beyond the sides of the conveyor to catch any excess liquid, as also any pulp removed from the fruit by the chemical reaction. The drip pan 129 extends throughout the length of the fluid treating station at 102 far enough to encompass fluid projected downwardly from any of the perforations 128.

The individual pieces of fruit are rotated on the shafts 119 by racks 130 disposed in position to engage with and actuate the pinions 122 as the trays 101 are advanced into the fluid treating station at 102. Pursuant to this purpose the racks 130 are suspended between pairs of branch tubes 127 from cross members 131 projecting laterally in opposite directions toward tubes of a pair, the opposite ends of the respective cross members 131 being connected to the respective tubes by clamp members 132 attached to the respective tubes 127. Projecting downwardly from each cross member 131 is the beam 133 which supports the rack 130 suspended in position to engage the pinions 122. There are as many cross members 131 and cooperating clamp members 132 and beams 133, disposed longitudinally of each pair of branch tubes 127, as are required to support the rack 130.

The hereinbefore description and the accompanying drawings, present several modifications of mechanical structure which will operate to carry out the practice of the invention. The disclosed embodiments are presented only as practical examples of the invention, and are not to be construed as limiting the scope thereof. The scope of the invention is determined by the accompanying claims.

I claim:

1. A fruit treating machine comprising, one or more stations for treating the fruit with fluid, fluid applying apparatus at each station, a plurality of fruit supporting trays, a plurality of fruit holders on each tray, a conveyor to transport the trays carrying the fruit to and away from each treating station, mechanism at each treating station to rotate the fruit to subject its entire surface to fluid treatment.

2. A fruit treating machine comprising, one or more stations for treating the fruit with fluid, fluid applying apparatus at each station, a plurality of fruit supporting trays, a plurality of fruit holders on each tray, a conveyor to transport the fruit loaded trays to and away from each station, means on the conveyor to engage the trays and hold them spaced apart along its length, means at each fluid treating station there to engage successive trays to rotate the fruit to subject its entire surface to fluid treatment.

3. A fruit treating machine comprising, one or more stations for treating the fruit with fluid, fluid applying apparatus at each station, a plurality of fruit supporting trays, a plurality of fruit holders on each tray, a conveyor to transport the fruit loaded trays to and away from each station, means on the conveyor to engage the trays and hold them spaced apart along its length, means at each fluid treating station there to engage successive trays to rotate the fruit to subject its entire surface to fluid treatment, independent means operable to engage a tray to support it for other processing of the fruit.

4. A fruit treating machine comprising, one or more stations for treating the fruit with fluid, fluid applying apparatus at each station, a plurality of fruit carrying trays, a plurality of fruit supporting pedestals on each tray, each pedestal to support a piece of fruit, the pedestals being spaced apart on the trays to hold the several pieces of fruit spaced away from each other, a conveyor to transport the fruit loaded trays to and away from each station, means on the conveyor to engage the trays and hold them spaced apart along its length, means at each fluid treating station there to engage successive trays to rotate the fruit to subject its entire surface to fluid treatment.

5. A fruit treating machine comprising, one or more stations for treating the fruit with fluid, fluid applying apparatus at each station, a plurality of fruit carrying trays, a plurality of fruit holders on each tray, a fruit supporting pedestal for each piece of fruit, attaching means each to receive and hold a pedestal detachably on a tray, a conveyor to transport the fruit loaded trays to and away from each station, means on the conveyor to engage the trays and hold them spaced apart along its length, means at each fluid treating station there to engage successive trays to rotate the fruit to subject its entire surface to fluid treatment.

6. A fruit treating machine comprising, one or more stations for treating the fruit with fluid, fluid applying apparatus at each station, a plurality of fruit carrying trays, a fruit supporting pedestal for each piece of fruit, a plurality of attaching means on each tray each attaching means to receive and hold a pedestal detachably on the tray, the several attaching means being spaced apart on the tray to holding the pieces of fruit spaced away from each other, a conveyor to transport the fruit loaded trays to and away from each station, means on the conveyor to engage the trays and hold them spaced apart along its length, means at each fluid treating station there to engage successive trays to rotate the fruit to subject its entire surface to fluid treatment.

7. A fruit treating machine comprising, one or more stations for treating the fruit with fluid, fluid applying apparatus at each station, a plurality of fruit carrying trays, each tray comprising a rotary member, a plurality of fruit supporting pedestals on each tray, each pedestal to support a piece of fruit, the pedestals being disposed circumferentially on the rotary member and spaced apart to hold the several pieces of fruit spaced away from each other, a conveyor to transport the fruit loaded trays to and away from each station, means on the conveyor to engage the trays and hold them spaced apart along its length, means at each fluid treating station there to engage successive trays to rotate the rotary member thereof to subject the entire surface of each piece of fruit to fluid treatment.

8. A fruit treating machine comprising, one or more stations for treating fruit with fluid, fluid applying apparatus at each station comprising a container of fluid, a plurality of fruit carrying trays each tray comprising a rotary member, a plurality of fruit supporting pedestals on the rotary member of each tray, each pedestal to support a piece of fruit, the pedestals being disposed circumferentially on the rotary member and spaced apart to hold the several pieces of fruit spaced away from each other, a conveyor to transport the fruit loaded tray to and away from each station, means on the conveyor to engage the trays and hold them spaced apart along its length, means at each fluid treating station there to engage successive trays to rotate the rotary member to submerge the several pieces of fruit into the fluid of the container.

9. A fruit treating machine comprising, one or more stations for treating the fruit with fluid, fluid applying apparatus at each station comprising a fluid spray directed into the path of the fruit, a plurality of fruit carrying trays each comprising a rotary member, a plurality of fruit supporting pedestals on the rotary member of each tray, each pedestal to support a piece of fruit, the pedestals being disposed circumferentially on the rotary member and spaced apart to hold the several pieces of fruit spaced away from each other, a conveyor, means spaced apart along the conveyor each to engage a tray to transport it with the conveyor, a transportation guide for transporting the conveyor to and away from each treating station, means on the conveyor to engage the trays and hold them spaced apart along its length, means at each fluid treating station, there to engage successive trays to rotate the rotary member to subject the entire circumference of the several pieces of fruit to the action of the fluid spray.

10. A fruit treating machine comprising, one or more stations for treating the fruit with fluid, a plurality of fruit carrying trays each tray comprising a rotary member, a plurality of fruit supporting pedestals on each tray mounted to rotate thereon, each pedestal to support a piece of fruit, the pedestals being disposed circumferentially on the rotary member and spaced apart to hold the several pieces of fruit spaced away from each other, a conveyor to transport the trays into and through each fluid treating station, means on the conveyor to engage the trays and hold them spaced apart along its length, fluid applying apparatus at each station comprising a fluid spray directed into the path of the fruit, means at each fluid treating station there to engage successive trays to rotate the rotary member to rotate the several pedestals under the fluid spray.

11. A fruit treating machine comprising, one or more stations for treating the fruit with fluid, a conveyor to transport the fruit successively into and through the several treating stations, a plurality of fruit carrying trays, attaching means on each tray, companion attaching means spaced apart along the conveyor each to engage the attaching means of a tray to transport the several trays successively with the conveyor, each fruit carrying tray comprising a plurality of fruit supporting pedestals pivotally mounted thereon to rotate relative thereto, each pedestal adapted to support a piece of fruit rotatably on the tray, fluid applying apparatus at each treating station comprising fluid spray directed into the path of the fruit, means at each fluid treating station there to engage successive trays to rotate the several pedestals under the fluid spray.

12. A fruit treating machine comprising, one or more stations for treating the fruit with fluid, a conveyor to transport the fruit successively into and through the several treating stations, a plurality of fruit carrying trays, attaching means on each tray, companion attaching means spaced apart along the conveyor each to engage the attaching means of a tray to transport the several trays successively with the conveyor, each fruit carrying tray comprising a plurality of fruit supporting pedestals pivotally mounted thereon to rotate relative thereto, each pedestal adapted to support a piece of fruit and comprising a rotating element, fluid applying apparatus at each treating station comprising fluid spray directed into the path of the fruit, means on each pedestal to rotate it, and means at each fluid treating station to engage the pedestal rotating means successively to rotate the pedestals as they pass under the fluid spray.

HARRY E. DI CRISTINA.